United States Patent
Yamashita et al.

(10) Patent No.: US 9,410,535 B2
(45) Date of Patent: Aug. 9, 2016

(54) BINARY POWER GENERATION SYSTEM

(71) Applicant: KABUSHIKI KAISHA TOSHIBA, Minato-ku (JP)

(72) Inventors: Katsuya Yamashita, Tokyo (JP); Osamu Furuya, Kanagawa (JP); Mohammand Ashari Hadianto, Kanagawa (JP); Mikio Takayanagi, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 204 days.

(21) Appl. No.: 14/346,582

(22) PCT Filed: Oct. 3, 2012

(86) PCT No.: PCT/JP2012/006362
§ 371 (c)(1),
(2) Date: Mar. 21, 2014

(87) PCT Pub. No.: WO2013/051265
PCT Pub. Date: Apr. 11, 2013

(65) Prior Publication Data
US 2014/0290244 A1  Oct. 2, 2014

(30) Foreign Application Priority Data
Oct. 3, 2011 (JP) ................................. 2011-219123

(51) Int. Cl.
*F03G 7/04* (2006.01)
*F01K 23/04* (2006.01)
(Continued)

(52) U.S. Cl.
CPC ... *F03G 7/04* (2013.01); *F01K 5/02* (2013.01); *F01K 23/04* (2013.01); *F24J 3/08* (2013.01); *F28F 9/22* (2013.01); *F24J 3/085* (2013.01); *Y02E 10/10* (2013.01)

(58) Field of Classification Search
CPC .............. F03G 7/04; Y02E 10/10; F28F 9/00; F28F 9/22; F28F 9/26; F28F 2009/004; F24J 3/08; F24J 3/085; F01K 13/00; F01K 23/04

See application file for complete search history.

(56) References Cited

U.S. PATENT DOCUMENTS 3,862,545 A * 1/1975 Ellis .......................... F03G 7/04
 60/641.5
3,986,362 A * 10/1976 Baciu ..................... F01K 3/181
 165/45

(Continued)

FOREIGN PATENT DOCUMENTS

JP 11-125172 5/1999
JP 2003-501575 1/2003

(Continued)

OTHER PUBLICATIONS

International Search Report Issued Dec. 25, 2012 in PCT/JP12/006362 filed Oct. 3, 2012.

*Primary Examiner* — Thomas Denion
*Assistant Examiner* — Xiaoting Hu
(74) *Attorney, Agent, or Firm* — Oblon, McClelland, Maier & Neustadt, L.L.P.

(57) ABSTRACT

A binary power generation system includes: a first pressure reducing steam-liquid separator which reduces the pressure of geothermal heat source water to separate the geothermal heat source water into water steam and hot liquid water; a steam turbine which is driven by geothermal water steam; a medium turbine which is driven by medium vapor obtained by evaporating a medium liquid with the geothermal heat source water as a heat source; a condenser/evaporator which is configured to transfer the heat of the water steam discharged from the steam turbine to the medium liquid so that the water steam is condensed and the medium liquid is evaporated; and a gas cooler which leads a working medium discharged from the medium turbine to thereby cool condensed water obtained by the condenser/evaporator and separate and discharge noncondensable gas contained in the condensed water.

8 Claims, 4 Drawing Sheets

(51) Int. Cl.
*F28F 9/22* (2006.01)
*F01K 5/02* (2006.01)
*F24J 3/08* (2006.01)

(56) References Cited

U.S. PATENT DOCUMENTS

| | | | | |
|---|---|---|---|---|
| 4,189,923 A * | 2/1980 | Berg | ............ | E21B 43/121 166/372 |
| 4,428,200 A * | 1/1984 | McCabe | ............ | F03G 7/04 165/45 |
| 5,400,598 A | 3/1995 | Moritz et al. | | |
| 5,531,073 A * | 7/1996 | Bronicki | ............ | F01D 15/10 60/641.2 |
| 5,582,011 A * | 12/1996 | Bronicki | ............ | F01K 23/04 60/641.5 |
| 5,628,190 A * | 5/1997 | Bronicki | ............ | F03G 7/04 60/641.2 |
| 5,671,601 A * | 9/1997 | Bronicki | ............ | F03G 7/04 60/641.2 |
| 5,809,782 A * | 9/1998 | Bronicki | ............ | F03G 7/04 60/641.2 |
| 5,970,714 A * | 10/1999 | Bronicki | ............ | F01K 23/04 60/641.3 |
| 6,009,711 A * | 1/2000 | Kreiger | ............ | F03G 7/04 60/641.2 |
| 6,212,890 B1 * | 4/2001 | Amir | ............ | F01K 23/04 60/641.2 |
| 6,223,535 B1 | 5/2001 | Kitz | | |
| 6,286,314 B1 | 9/2001 | Kitz | | |
| 6,912,853 B2 * | 7/2005 | Amir | ............ | F03G 7/04 60/641.2 |
| 7,775,045 B2 | 8/2010 | Kaplan et al. | | |
| 7,797,940 B2 | 9/2010 | Kaplan et al. | | |
| 7,823,386 B2 | 11/2010 | Zimron et al. | | |
| 8,371,122 B2 * | 2/2013 | Lewis | ............ | F03G 7/04 60/641.2 |
| 2001/0007193 A1 | 7/2001 | Kitz | | |
| 2001/0010156 A1 | 8/2001 | Kitz | | |
| 2007/0095065 A1 | 5/2007 | Kaplan et al. | | |
| 2007/0095066 A1 | 5/2007 | Kaplan et al. | | |

FOREIGN PATENT DOCUMENTS

| | | |
|---|---|---|
| JP | 2009-197808 | 9/2009 |
| JP | 2009-221961 | 10/2009 |
| JP | 2011-169207 | 9/2011 |

* cited by examiner

BINARY POWER GENERATION SYSTEM

TECHNICAL FIELD

Embodiments of this invention relate to a binary power generation system using geothermal heat.

BACKGROUND ART

The greenhouse effect from $CO_2$ has recently been pointed out as one of the causes of the global warming phenomenon. Immediate actions are needed to protect the earth's environment. $CO_2$ sources include human activities of burning fossil fuels, and there is an increasing demand for emission control. As a result, new construction of thermal power plants and the like using large amounts of fossil fuels has been stagnating because of high $CO_2$ emissions.

Demand is increasing for power generation methods using renewable energies that produce no $CO_2$, such as solar light, solar heat, wind power, geothermal heat, and tidal power. Of these, power generation systems using geothermal steam and geothermal water have been commercialized since the 1950s. With high construction costs, geothermal power plants used to decline in the age of decreasing fossil fuel costs, whereas the demand has been increasing again in recent years. Some of existing geothermal power plants are shifting from a flash geothermal power generation system in which a steam turbine is driven by geothermal steam to a binary geothermal power generation system in which hot water is used as a heat source to evaporate an organic working medium for generation because the thermal energy of the geothermal steam decreases gradually.

Such a binary geothermal power generation system uses a medium having a boiling point lower than that of water as the working medium. Examples of the low-boiling medium include chlorofluorocarbons which were used as the working medium of refrigerators until 1990. Since existing chlorofluorocarbons harm the ozone layer and there has been found no low-boiling medium to be a workable alternative, the binary geothermal power generation system has not been actively put to practical use in Japan.

Under the circumstances, binary power generation systems using flammable but produced-in- volume butane ($C_4H_{10}$) or pentane ($C_5H_{12}$) as the working medium have been commercialized.

In a technique disclosed in Patent Document 1, a pressure reducing steam-liquid separator flashes and separates geothermal water into steam and hot liquid water. The hot water having lower enthalpy preheats the working medium, and the flashed steam evaporates the working medium. Such a system is effective if the proportion of the flashed steam is small.

When organic working vapor medium is expanded in a turbine, the degree of superheat increases and gas (vapor) having a temperature higher than a condensation temperature in a condenser is condensed. In a technique disclosed in Patent Document 2, preheater outlet liquid medium is injected into an intermediate stage of a working medium turbine so that the gas having a high degree of superheat is mixed with the saturated liquid. As a result, the energy of the degree of superheat can be used to increase the driving flow rate of the turbine and improve the cycle efficiency.

In a technique disclosed in Patent Document 3, a steam turbine is driven by flashed steam from a geothermal water pressure reducing steam-liquid separator. The exhausted steam evaporates a medium, and hot water separated from the pressure reducing steam-liquid separator superheats the medium. Proposed modifications include the following:

(1) Install a regenerator at the outlet of the medium turbine.
(2) Provide a two-stage medium turbine, and reheat the vapor medium by the hot water from the outlet of a superheater.

In a technique disclosed in Patent Document 4 and a technique disclosed in Patent Document 5, a steam turbine is driven by part of flashed steam from a geothermal water pressure reducing steam-liquid separator. The rest of the flashed steam evaporates a medium. The exhausted steam from the steam turbine and hot water from the pressure reducing steam-liquid separator preheat the medium. A regenerator is arranged at the outlet of a medium turbine. A modified embodiment is disclosed in which a two-stage medium turbine is provided and the vapor medium is reheated by hot water from the outlet of a superheater.

A technique disclosed in Patent Document 6 deals with a system that is not limited to geothermal power generation but also takes into account solar heat and the exhaust heat of thermal power generation etc. Two types of media, one for high temperature and the other for low temperature, are used to constitute a cascaded Rankine cycle, which is a basic form of cascade type.

Patent Document 7 discloses one including a plurality of evaporators with different pressures.

DOCUMENTS OF PRIOR ART

Patent Document

Patent Document 1: U.S. Pat. No. 5,400,598
Patent Document 2: U.S. Pat. No. 5,531,073
Patent Document 3: U.S. Pat. No. 6,009,711
Patent Document 4: U.S. Pat. No. 7,775,045
Patent Document 5: U.S. Pat. No. 7,797,940
Patent Document 6: U.S. Pat. No. 7,823,386
Patent Document 7: Japanese Patent Application Laid-Open Publication No. 2009-221961

SUMMERY OF THE INVENTION

Problems to be Solved by the Invention

As described above, demand for geothermal power generation has been increasing from the viewpoint of global warming. Power plants have already been constructed in locations where high quality geothermal sources are and in locations where geothermal sources have high enthalpy and provide a high proportion of flashed steam when reduced in pressure. On existing geothermal power plants, it is reported that the heat sources in the entire locations are weakening, and the proportion of steam is on the decrease and the proportion of hot water on the increase. Under the circumstances, a binary geothermal power generation system using not a steam turbine but a low-boiling working medium such as an organic medium is advantageous. Since geothermal sources are seldom fully depleted of steam to produce only hot water, a power generation system combining a flash type and a binary type is the most advantageous.

Among the foregoing systems combining a flash geothermal power generation system and a binary geothermal power generation system are ones that reduce the pressure of (flash) the geothermal source before using only the hot water for binary power generation, and ones that use both the exhaust of the turbine driven by the flashed steam and the hot water for binary power generation. The binary power generation systems that perform binary power generation by using only the hot water as a heat source have a small capacity, a low output rate, and a high unit cost of binary power generation.

Assume a system in which a turbine driven by flashed steam has a back pressure higher than or equal to atmospheric pressure. The latent heat of the steam of 100 degrees centigrade or above evaporates a working medium such as an organic medium. The vapor medium is superheated by hot water from the outlet of a pressure reducing steam-liquid separator, having a temperature higher than that of the exhausted turbine steam, and drives a medium turbine. The system includes a regenerator that performs heat exchange between the superheated vapor from the outlet of the medium turbine and liquid medium from a condenser. In such a system, the heat exchange is performed between the vapor medium from the turbine outlet, which originally has a high degree of superheat, and the liquid medium. This increases pressure loss on the vapor medium side of the regenerator and increases the outlet pressure of the medium turbine, failing to provide a high effect. In addition, the exhaust gas of the steam turbine originally contains noncondensable gas, which needs to be extracted and collected.

Embodiments of the present invention have been achieved in view of the foregoing circumstances, and it is an object thereof to increase the efficiency of a binary power generation system that combines a geothermal flash vapor cycle and a non-water working medium cycle.

Means for Solving the Problems

In order to solve the problems, according to an aspect of the present invention, there is provided a binary power generation system comprising: a first pressure reducing steam-liquid separator that reduces pressure of geothermal heat source water to separate geothermal heat source water into water steam and hot liquid water; a steam turbine that is driven by the water steam; a medium turbine that is driven by vapor medium obtained by evaporating liquid medium by using the geothermal heat source water as a heat source; a condenser/evaporator that is configured to transfer heat of the water steam discharged from the steam turbine to the liquid medium so that the water steam is condensed and the liquid medium is evaporated; a gas cooler that further cools gas remaining in the condenser/evaporator by using a medium discharged from the medium turbine as a cold source, thereby separating and discharging noncondensable gas contained in the gas; and at least one generator to be driven by the steam turbine and the medium turbine.

According to another aspect of the present invention, there is provided a binary power generation system comprising: a first pressure reducing steam-liquid separator that reduces pressure of geothermal heat source water to separate geothermal heat source water into water steam and hot liquid water; a steam turbine that is driven by the water steam; a high pressure evaporator that evaporates a working medium to generate high pressure vapor medium by using the geothermal heat source water as a heat source; a high pressure medium turbine that is driven by the high pressure vapor medium; a condenser/evaporator that is configured to mix vapor medium discharged from the high pressure medium turbine with liquid medium supplied separately from the vapor medium, and transfer heat of the water steam discharged from the steam turbine to the working medium so that the water steam is condensed and low pressure vapor medium having a pressure lower than that of the high pressure vapor medium is generated; a low pressure medium turbine that is driven by the low pressure vapor medium; a condenser that condenses vapor medium discharged from the low pressure medium turbine to generate the liquid medium; and at least one generator to be driven by the steam turbine, the high pressure medium turbine, and the low pressure medium turbine.

EMBODIMENTS FOR CARRYING OUT THE INVENTION

Embodiments of the present invention will be described below with reference to the drawings. The same or similar parts will be designated by common reference symbols. A redundant description thereof will be omitted.

The embodiments include a heat source water system along a flow of supplied geothermal heat source water and a medium system which operates by receiving heat from the heat source water system. An organic medium and the like having a boiling point lower than that of water at atmospheric pressure may be used as a working medium in the medium system.

[First Embodiment]

Figure 1:
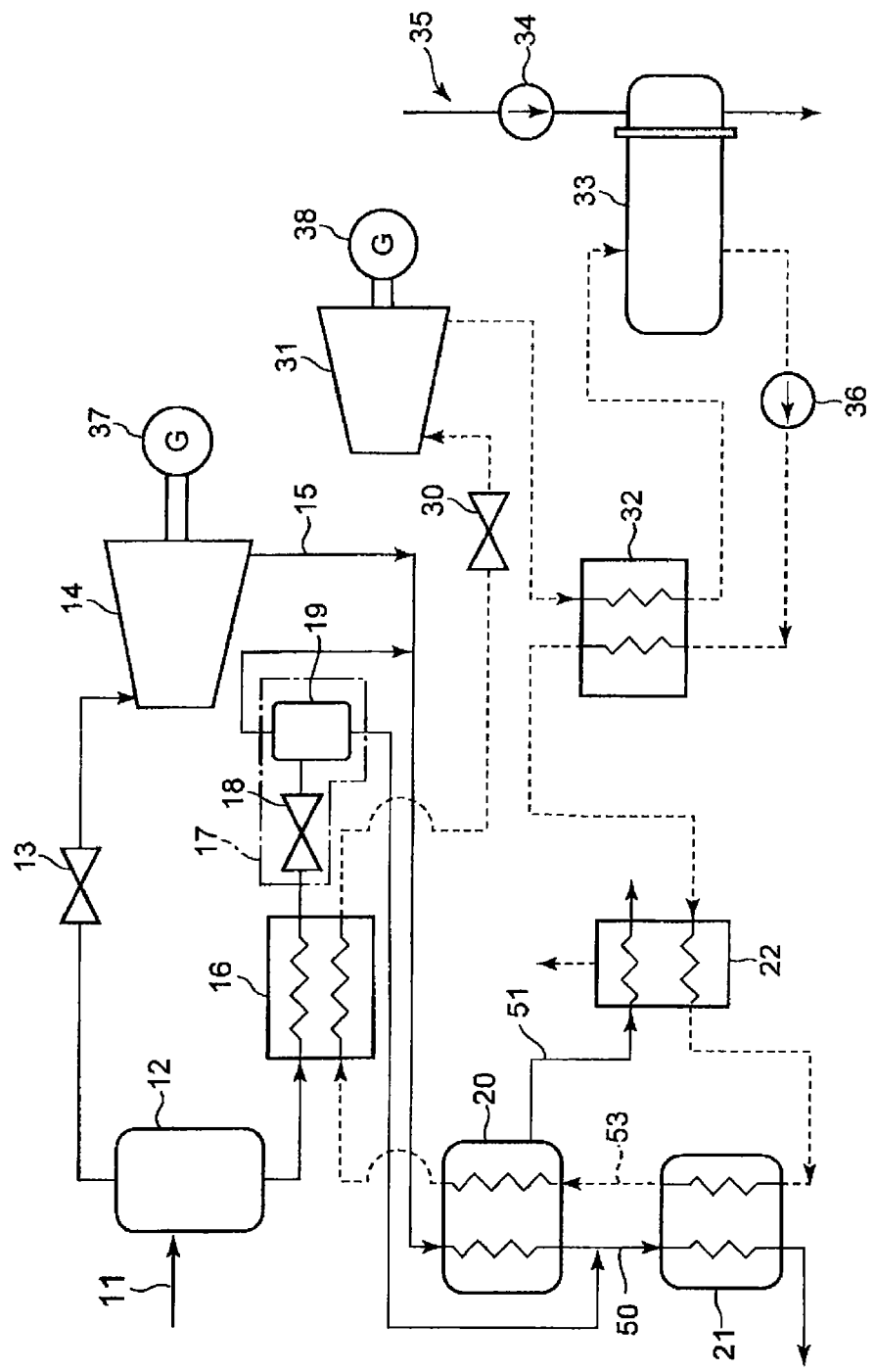
FIG. 1 is a system diagram showing a configuration of a first embodiment of the binary power generation system according to the present invention.

FIG. 1 is a system diagram showing a configuration of a first embodiment of the binary power generation system according to the present invention.

<Heat Source Water System>

Initially, a configuration of a heat source water system will be described along a flow of supplied geothermal heat source water.

Geothermal heat source water piping 11 is connected to a first pressure reducing steam-liquid separator (flasher) 12. Geothermal heat source water supplied to the first pressure reducing steam-liquid separator 12 through the geothermal heat source water piping 11 is reduced in pressure there, and separated into high pressure water steam and high pressure hot water (liquid water). The generated water steam is sent to a steam turbine 14 via a water steam governing valve 13. Low pressure steam having worked in the steam turbine 14 is discharged through steam turbine return piping 15.

The high pressure hot water generated by the first pressure reducing steam-liquid separator 12 is sent to a medium superheater 16 and further sent to a second pressure reducing steam-liquid separator 17. The second pressure reducing steam-liquid separator 17 includes a pressure reducing valve 18 on the upstream side and a steam-liquid separator 19 connected downstream. The hot water sent to the second pressure reducing steam-liquid separator 17 is separated here into low pressure water steam and low pressure hot water (liquid water).

The low pressure water steam generated by the second pressure reducing steam-liquid separator 17 joins the steam turbine return piping 15 and is sent to a condenser/evaporator 20. The low pressure water steam sent to the condenser/evaporator 20 releases heat here, whereby 90% or more of the low pressure water steam is condensed into condensate (liquid water). The condensate obtained by the condenser/evaporator 20 is sent to a preheater 21 via condensate piping 50, and further releases heat here and becomes water of lower temperature.

The low pressure water steam sent to the condenser/evaporator 20 contains a noncondensable gas component. The gas left uncondensed in the low pressure water steam sent to the condenser/evaporator 20 is sent to a gas cooler 22 via gas cooler inlet piping 51. The gas is further cooled here, and the remaining gas is emitted to the air as noncondensable gas. The low pressure hot water obtained by the second pressure reducing steam-liquid separator 17 joins the condensate piping 50 and is sent to the preheater 21.

<Medium System>

Next, a non-water medium system will be described.

Vapor medium is supplied to the medium superheater 16. The vapor medium receives heat from the high pressure hot water generated by the first pressure reducing steam-liquid separator 12, whereby superheated vapor medium is generated. The superheated vapor medium is supplied to a medium turbine 31 via a vapor medium governing valve 30. Low pressure vapor medium having worked in the medium turbine 31 is cooled by a regenerator 32, and further sent to a medium condenser 33, where the low pressure vapor medium is cooled and condensed. The medium condenser 33 is cooled by a cold water system 35 including a cold water pump 34.

A medium pump 36 increases pressure of the liquid medium condensed by the medium condenser 33. In the regenerator 32, the liquid medium increased in pressure by the medium pump 36 is heated by heat exchange with the vapor medium that is sent from the medium turbine 31 and yet to be condensed by the medium condenser 33. The heated liquid medium is sent to the gas cooler 22. The gas cooler 22 transfers heat from the noncondensable gas to the working medium. The liquid medium heated by the gas cooler 22 is sent to the preheater 21. The preheater 21 transfers heat from the hot water to the liquid medium to preheat the liquid medium.

The liquid medium preheated by the preheater 21 is sent to the condenser/evaporator 20 via preheater liquid medium outlet piping 53. The liquid medium is heated and evaporated here by latent heat occurring during the condensation of the water steam, whereby vapor medium is generated. The vapor medium is sent to the medium superheater 16.

The steam turbine 14 and the medium turbine 31 are coaxially coupled with a generator 37 and a generator 38, respectively.

According to the present embodiment, the noncondensable gas component contained in the geothermal heat source water can be released to the air from the gas cooler 22. As a result, the water condensed by the condenser/evaporator 20 can be smoothly led to the preheater 21.

The low-temperature liquid medium coming out of the regenerator 32 is used as a cold source of the gas cooler 22. The cold heat enables emission of highly-concentrated noncondensable gas. The liquid medium can also be heated for a regeneration effect.

In such a manner, the efficiency of the binary power generation system combining a geothermal flash steam cycle and a non-water working medium cycle can be increased.

[Second Embodiment]

Figure 2:
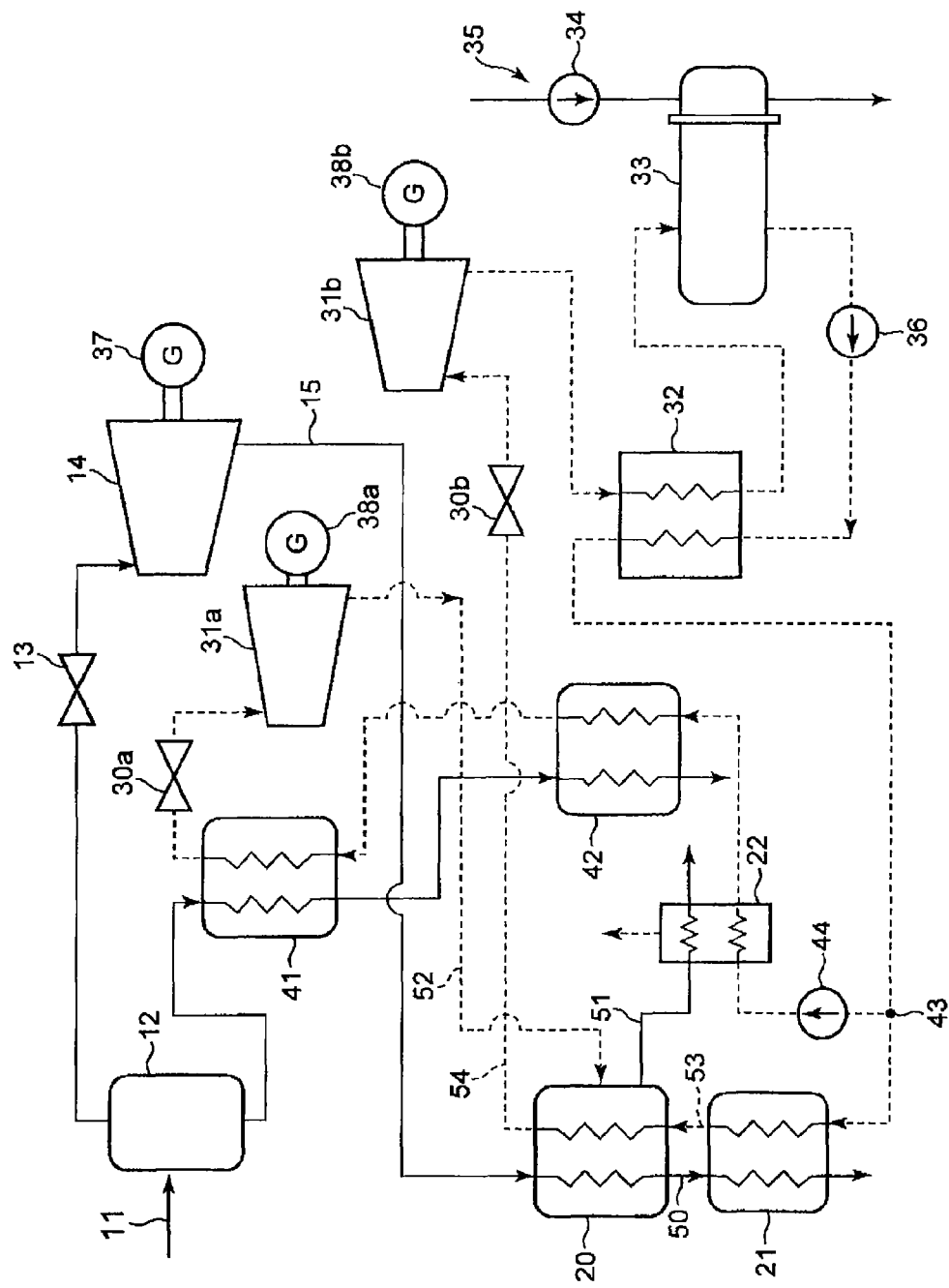
FIG. 2 is a system diagram showing a configuration of a second embodiment of the binary power generation system according to the present invention.
Figure 3:
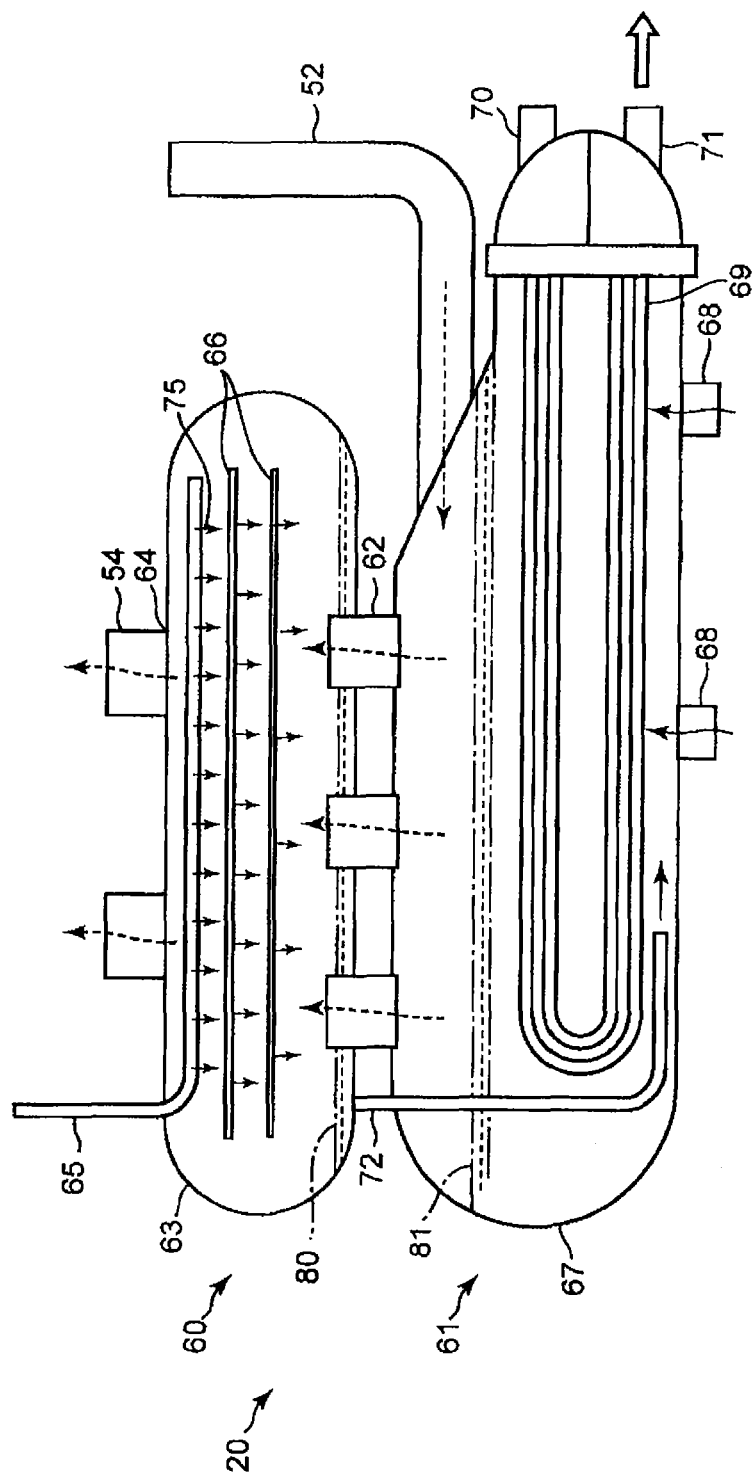
FIG. 3 is a longitudinal sectional view showing a specific configuration of a condenser/evaporator according to the second embodiment.

FIG. 2 is a system diagram showing a configuration of a second embodiment of the binary power generation system according to the present invention. FIG. 3 is a longitudinal sectional view showing a specific configuration of a condenser/evaporator according to the second embodiment.

<Heat Source Water System>

Geothermal heat source water piping 11 is connected to a first pressure reducing steam-liquid separator 12. Geothermal heat source water supplied to the first pressure reducing steam-liquid separator 12 through the geothermal heat source water piping 11 is reduced in pressure there and separated into high pressure water steam and high pressure hot water (liquid water). The water steam generated here is sent to a steam turbine 14 via a water steam governing valve 13. Low pressure steam having worked in the steam turbine 14 is discharged through steam turbine return piping 15.

The high pressure hot water (liquid water) generated by the first pressure reducing steam-liquid separator 12 is sent to a high pressure evaporator 41, where the high pressure hot water is cooled by heat exchange with a working medium. The high pressure hot water is then sent to a high pressure preheater 42, where the high pressure hot water is further cooled by heat exchange with liquid medium.

The low pressure water steam discharged from the steam turbine 14 through the steam turbine return pipe 15 is sent to a condenser/evaporator 20. The low pressure water steam sent to the condenser/evaporator 20 releases heat here, whereby 90% or more of the low pressure water steam is condensed into condensate (liquid water). The condensate obtained by the condenser/evaporator 20 is sent to a preheater 21 via condensate piping 50. The condensate further releases heat here and becomes water of lower temperature.

The low pressure water steam sent to the condenser/evaporator 20 contains a noncondensable gas component. The gas left uncondensed in the low pressure water steam sent to the condenser/evaporator 20 is sent to a gas cooler 22 via gas cooler inlet piping 51. The gas is further cooled here, and the remaining gas is emitted to the air as noncondensable gas.

<Medium System>

Next, a non-water medium system will be described.

High temperature liquid medium is supplied to the high pressure evaporator 41. The high temperature liquid medium receives heat from the high pressure hot water generated by the first pressure reducing steam-liquid separator 12, whereby high pressure vapor medium is generated. The high pressure vapor medium is sent to a high pressure medium turbine 31a via a high pressure vapor medium governor value 30a. Low pressure vapor medium having worked in the high pressure medium turbine 31a is sent to the condenser/evaporator 20 via high pressure medium turbine return piping 52.

Liquid medium is supplied to the preheater 21, where the liquid medium receives heat from the condensate and is preheated. The liquid medium preheated by the preheater 21 is sent to the condenser/evaporator 20 via preheater liquid medium outlet piping 53. In the condenser/evaporator 20, the supplied liquid medium and the vapor medium receive heat from the condensate to evaporate, whereby low pressure vapor medium is generated. The low pressure vapor medium generated by the condenser/evaporator 20 is supplied to a low pressure medium turbine 31b through low pressure vapor medium supply piping 54 and via a low pressure vapor medium governing valve 30b. The low pressure vapor medium supplied to the low pressure medium turbine 31b has a lower pressure than the high pressure vapor medium supplied to the high pressure medium turbine 31a.

The low pressure vapor medium having worked in the low pressure medium turbine 31b is cooled by a regenerator 32. The resultant is further sent to a medium condenser 33 and further cooled to condense. The medium condenser 33 is cooled by a cold water system 35 including a cold water pump 34.

A medium pump 36 increases pressure of the medium condensed by the medium condenser 33. In the regenerator 32, the liquid medium increased in pressure by the medium pump 36 is heated by heat exchange with the vapor medium that is sent from the low pressure medium turbine 31b and yet to be condensed by the medium condenser 33. The heated liquid medium is then sent to the preheater 21 through a branching point 43.

Part of the liquid medium passed through the branching point 43 is not directed to the preheater 21 but pressurized by a medium pressurizing pump 44 and sent to the gas cooler 22. The gas cooler 22 transfers heat from the noncondensable gas to the liquid medium. The liquid medium heated by the gas cooler 22 is sent to the high pressure preheater 42. The high pressure preheater 42 transfers heat from the hot water to the liquid medium. The liquid medium is preheated and sent to the high pressure evaporator 41.

The steam turbine 14, the high pressure medium turbine 31a, and the low pressure medium turbine 31b are coaxially coupled with a generator 37, a generator 38a, and a generator 38b, respectively.

<Condenser/Evaporator>

Now, a configuration of the condenser/evaporator 20 will be described with reference to FIG. 3.

The condenser/evaporator 20 includes an upper evaporator 60, and a lower evaporator 61 arranged below the upper evaporator 60. The condenser/evaporator 20 further includes vapor medium communication pipes 62 and a liquid medium downcomer 72 which connect the upper evaporator 60 and the lower evaporator 61.

The upper evaporator 60 includes a cylindrical upper evaporator barrel 63 which extends horizontally. Low pressure vapor medium discharge units 64 are arranged on the top of the upper evaporator barrel 63. The low pressure vapor medium supply piping 54 is connected to the low pressure vapor medium discharge units 64. An upper liquid medium introduction unit 65 branched from the preheater liquid medium outlet piping 53 (FIG. 2) is connected to an upper portion of the upper evaporator barrel 63. The upper liquid medium introduction unit 65 is inserted into and arranged in the upper portion of the upper evaporator barrel 63. The upper liquid medium introduction unit 65 extends horizontally inside the upper evaporator barrel 63, and has a large number of nozzles 75 which are horizontally distributed.

In the upper evaporator barrel 63, a plurality of porous plates 66 extending horizontally are arranged in parallel so as to be vertically separated from each other.

The lower evaporator 61 includes a cylindrical lower evaporator barrel 67 which extends horizontally in parallel with the upper evaporator barrel 63. Lower liquid medium introduction units 68 branched from the preheater liquid medium outlet piping 53 (FIG. 2) are connected to the bottom portion of the lower evaporator barrel 67. The high pressure medium turbine return piping 52 is connected to an upper portion of the lower evaporator barrel 67.

A large number of heat transfer pipes 69 are arranged in parallel with each other in the lower evaporator barrel 67. The heat transfer pipes 69 are U-shaped pipes each having straight pipe portions which extend horizontally straight and a curved pipe portion which is vertically curved. A steam turbine return piping connection unit 70 connected to the steam turbine return piping 15 (FIG. 2) is formed on the lower evaporator barrel 67 on the inlet side of the heat transfer pipes 69. A condensate/steam discharge unit 71 connected to the condensate piping 50 and the gas cooler inlet piping 51 (FIG. 2) is formed on the lower evaporator barrel 67 on the outlet side of the heat transfer pipes 69. The steam turbine return piping connection unit 70 is located above the condensate/steam discharge unit 71.

The vapor medium communication pipes 62 extend vertically to make the upper evaporator barrel 63 and the lower evaporator barrel 67 communicate with each other. The vapor medium communication pipes 62 have open top ends which protrude somewhat above the bottom of the upper evaporator barrel 63. The lower ends of the vapor medium communication pipes 62 are opened to the top of the lower evaporator barrel 67.

The top end of the liquid medium downcomer 72 is opened to the bottom of the upper evaporator barrel 63. The lower portion of the liquid medium downcomer 72 penetrates the upper portion of the lower evaporator barrel 67. The lower end of the liquid medium downcomer 72 is opened in the lower evaporator barrel 67 near the bottom.

Next, an operation of the condenser/evaporator 20 will be described.

Part of the liquid medium from the preheater liquid medium outlet piping 53 (FIG. 2) is sprayed into the upper portion of the upper evaporator barrel 63 through the nozzles 75 of the upper liquid medium introduction unit 65. The liquid medium falls on the porous plates 66, passes through the porous plates 66 downward, and is accumulated in the lower portion of the upper evaporator barrel 63 to form an upper evaporator barrel liquid medium surface 80. The upper evaporator barrel liquid medium surface 80 is controlled to be positioned below the porous plate 66 that is located the lowest. The liquid medium in the upper evaporator barrel 63 is further introduced into the lower evaporator barrel 67 through the liquid medium downcomer 72.

Part of the liquid medium from the preheater liquid medium output piping 53 is introduced into the lower evaporator barrel 67 from the bottom through the lower liquid medium introduction units 68.

The liquid medium in the lower evaporator barrel 67 forms a lower evaporator barrel liquid medium surface 81. The lower evaporator barrel liquid medium surface 81 is controlled to be positioned above the uppermost portion of the heat transfer pipes 69 and below the portion where the high pressure medium turbine return piping 52 is connected to the lower evaporator barrel 67.

Medium gas having a high degree of superheat, discharged from the high pressure medium turbine 31a (FIG. 2), is introduced into the upper portion of the lower evaporator barrel 67 through the high pressure medium turbine return piping 52.

The steam discharged from the steam turbine is introduced into the heat transfer pipes 69 from the steam turbine return piping 15 (see FIG. 2) through the steam turbine return piping connection unit 70. Note that the steam contains noncondensable gas. Most of the steam in the heat transfer pipes 69 is cooled and condensed by the liquid medium outside the heat transfer pipes 69. The resultant is discharged from the condensate/steam discharge unit 71 as a gas-liquid two-phase flow, and sent to the condensate piping 50 and the gas cooler inlet piping 51. In FIG. 2, the condensate piping 50 and the gas cooler inlet piping 51 are shown to be separately extended from the condenser/evaporator 20. However, as shown in FIG. 3, such piping may be extended from the condenser/evaporator 20 as a single condenser/evaporator discharge unit 71 and may be branched downstream.

In the lower evaporator barrel 67, the liquid medium outside the heat transfer pipes 69 is heated to evaporate from the areas in contact with the heat transfer pipes 69, and rises to above the lower evaporator barrel liquid medium surface 81 as bubbles. The bubbles are merged with the vapor medium introduced through the high pressure medium turbine return piping 52. The resultant passes through the vapor medium communication pipes 62 upward and flows into the upper evaporator barrel 63.

In the upper evaporator barrel 63, the rising vapor medium and the falling liquid medium make direct contact and get mixed with each other for heat exchange. Eventually, the vapor medium near its saturation temperature is sent to the low pressure vapor medium supply piping 54 through the low pressure vapor medium discharge units 64.

According to this embodiment, the efficiency of the binary power generation system combining a geothermal flash steam cycle and a working medium cycle can be increased.

The low-temperature liquid medium coming out of the regenerator 32 is used as a cold source of the gas cooler 22. The cold heat enables emission of highly-concentrated non-condensable gas. The liquid medium can also be heated for a regeneration effect.

In particular, the high-temperature hot water from the first pressure reducing steam-liquid separator 12 is used to evaporator the working medium at higher pressure, and the turbines are driven by the medium gases of two different pressures. This can increase the generation output power without increasing the degree of superheat at the outlet. In other words, the temperature levels of the geothermal steam and hot water can be utilized to reduce the degree of superheat.

[Third Embodiment]

Figure 4:
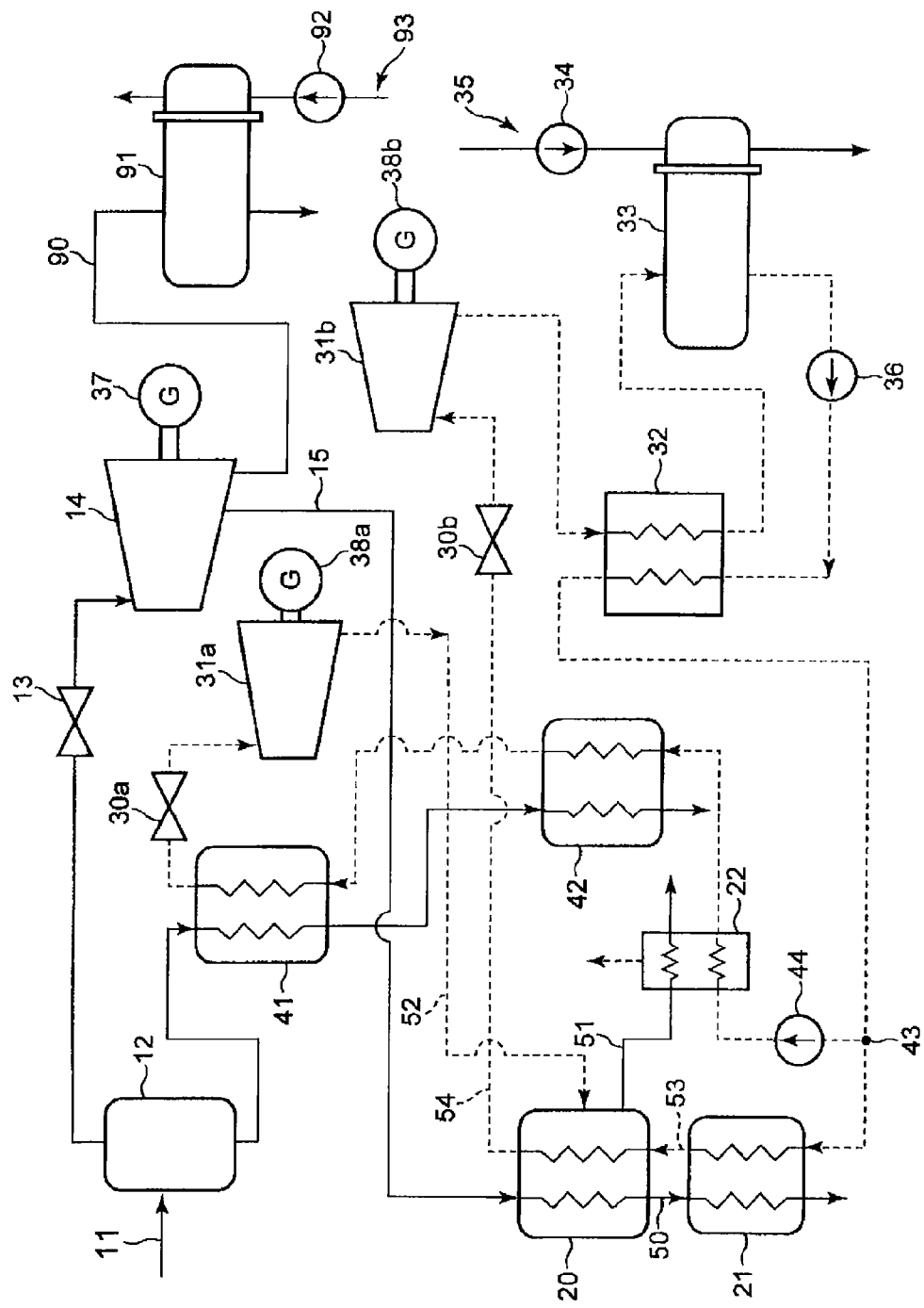
FIG. 4 is a system diagram showing a configuration of a third embodiment of the binary power generation system according to the present invention.

FIG. 4 is a system diagram showing a configuration of a third embodiment of the binary power generation system according to the present invention.

This embodiment is a modification of the second embodiment. Differences from the second embodiment will be mainly described here.

In this embodiment, part of the steam is extracted at an intermediate stage. The extracted steam is sent to the condenser/evaporator 20 through the steam turbine return piping 15.

Water steam discharged from the lowest stage of the steam turbine 14 is sent to a condenser 91 through steam turbine discharge piping 90. The condenser 91 is connected with a cold water system 93 including a cold water pump 92. The cold water system 93 cools the water steam in the condenser 91 into condensate. The pressure inside the condenser 91 is preferably lower than or equal to atmospheric pressure.

As described above, this embodiment differs from the second embodiment in that the water steam sent to the condenser/evaporator 20 through the steam turbine return piping 15 is extracted steam, and that the water steam discharged from the lowest stage of the steam turbine 14 is sent to the condenser 91. The rest of the configuration and operation are the same as in the second embodiment.

The operation and advantages of the third embodiment are basically the same as those of the second embodiment. The third embodiment is advantageous when the flashed steam is large in amount, i.e., when the volumetric flow rate of the water steam discharged from the steam turbine 14 is high.

[Other Embodiments]

Several embodiments of the present invention have been described so far. The foregoing embodiments have been presented by way of example, and are not intended to limit the scope of the invention. The foregoing embodiment can be practiced in various other forms, and various omissions, substitutions, and modifications may be made without departing from the gist of the invention. Such embodiments and modifications are intended to be covered by the scope and gist of the invention, as well as embraced in the inventions set forth in the claims and the range of equivalency thereof.

For example, in the foregoing embodiments, different generators are attached to the respective turbines. However, a common generator may be attached to a plurality of turbines by connecting the shafts of the turbines to each other or by coupling the shafts via gears.

In the foregoing second embodiment, horizontally-extending porous trays may be arranged instead of the porous plates 66 arranged in the upper evaporator barrel 63.

EXPLANATION OF REFERENCE SYMBOLS

11: geothermal heat source water piping
12: first pressure reducing steam-liquid separator
13: water steam governing valve
14: steam turbine
15: steam turbine return piping
16: medium superheater
17: second pressure reducing steam-liquid separator
18: pressure reducing valve
19: steam-liquid separator
20: condenser/evaporator
21: preheater
22: gas cooler
30: vapor medium governing valve
30a: high pressure vapor medium governing valve
30b: low pressure vapor medium governing valve
31: medium turbine
31a: high pressure medium turbine
31b: low pressure medium turbine
32: regenerator
33: medium condenser
34: cold water pump
35: cold water system
36: medium pump
37: generator
38: generator
38a: generator
38b: generator
41: high pressure evaporator
42: high pressure preheater
43: branching point
44: medium pressurizing pump
50: condensate piping
51: gas cooler inlet piping
52: high pressure medium turbine return piping
53: preheater liquid medium outlet piping
54: low pressure vapor medium supply piping
60: upper evaporator
61: lower evaporator
62: vapor medium communication pipe
63: upper evaporator barrel
64: lower pressure vapor medium discharge unit
65: upper liquid medium introduction unit
66: porous plate
67: lower evaporator barrel
68: lower liquid medium introduction unit
69: heat transfer pipe
70: steam turbine return piping connection unit
71: condensate/steam discharge unit
72: liquid medium downcomer
75: nozzle
80: upper evaporator barrel liquid medium surface
81: lower evaporator barrel liquid medium surface
90: evaporator turbine discharge piping
91: condenser
92: cold water pump
93: cold water system

The invention claimed is:

1. A binary power generation system comprising:
a first pressure reducing steam-liquid separator that reduces pressure of a geothermal heat source water to separate the geothermal heat source water into water steam and hot liquid water;
a steam turbine that is driven by the water steam;
a condenser/evaporator that is configured to transfer heat of the water steam discharged from the steam turbine to a liquid medium so that the water steam is condensed and the liquid medium is evaporated;
a medium superheater that transfers heat from the hot liquid water to the evaporated medium to generate superheated vapor medium;
a medium turbine that is driven by the superheated vapor medium;
a second pressure reducing steam-liquid separator that reduces pressure of the hot liquid water from the medium superheater to separate the hot liquid water into water steam and the hot liquid water, wherein the water steam separated by the second pressure reducing steam-liquid separator is led directly into the condenser/evaporator along with the water steam discharged from the steam turbine;
a gas cooler that further cools gas remaining in the condenser/evaporator by using the medium discharged from the medium turbine as a cold source, thereby separating and discharging noncondensable gas contained in the gas; and
at least one generator to be driven by the steam turbine and the medium turbine.

2. The binary power generation system according to claim 1, further comprising:
a medium condenser that cools and condenses the vapor medium discharged from the medium turbine to generate the liquid medium, wherein
the gas cooler uses the liquid medium generated by the medium condenser as the cold source.

3. The binary power generation system according to claim 2, further comprising:
a regenerator that cools the vapor medium discharged from the medium turbine and transfers heat obtained by cooling the vapor medium to the liquid medium generated by the medium condenser, wherein
the gas cooler uses the liquid medium heated by the regenerator as the cold source.

4. The binary power generation system according to claim 1, further comprising:
a regenerator that cools the vapor medium discharged from the medium turbine and heats the liquid medium to be sent to the gas cooler; and
a medium condenser that further cools the vapor medium cooled by the regenerator.

5. A binary power generation system comprising:
a first pressure reducing steam-liquid separator that reduces pressure of a geothermal heat source water to separate the geothermal heat source water into water steam and hot liquid water;
a steam turbine that is driven by the water steam;
a high pressure evaporator that evaporates a working medium to generate high pressure vapor medium by using the geothermal heat source water as a heat source;
a high pressure medium turbine that is driven by the high pressure vapor medium;
a condenser/evaporator that is configured to mix vapor medium discharged from the high pressure medium turbine with liquid medium supplied separately from the vapor medium, and transfer heat of the water steam discharged from the steam turbine to the working medium so that the water steam is condensed and low pressure vapor medium having a pressure lower than that of the high pressure vapor medium is generated;
a low pressure medium turbine that is driven by the low pressure vapor medium;
a medium condenser that condenses vapor medium discharged from the low pressure medium turbine to generate the liquid medium;
at least one generator to be driven by the steam turbine, the high pressure medium turbine, and the low pressure medium turbine; and
a preheater that performs heat exchange between the liquid medium discharged from the medium condenser and condensate discharged from the condenser/evaporator to preheat the liquid medium by heat obtained from the condensate,
a gas cooler that further cools gas remaining in the condenser/evaporator by using the liquid medium discharged from the medium condenser as a cold source, thereby separating and discharging noncondensable gas contained in the gas, wherein
the condenser/evaporator includes:
an upper evaporator having:
an upper liquid medium introduction unit that introduces part of the liquid medium preheated by the preheater, and
a low pressure vapor medium discharge unit that discharges the low pressure vapor medium:
a lower evaporator that is arranged below the upper evaporator, the lower evaporator having:
a high pressure medium turbine return piping connection unit that introduces the vapor medium discharged from the high pressure medium turbine,
a steam turbine return piping connection unit that introduces the water steam discharged from the steam turbine,
a heat transfer pipe through which the water steam introduced from the steam turbine return piping connection unit or condensate generated from the water steam passes,
a condensate/steam discharge unit that discharges the condensate and the water steam passed through the heat transfer pipe to the preheater and the gas cooler, and
a lower liquid medium introduction unit that introduces a second part of the liquid medium preheated by the preheater; and
a vapor medium communication pipe that makes the vapor medium in the upper evaporator communicate with the vapor medium outside the heat transfer pipe in the lower evaporator.

6. The binary power generation system according to claim 5, further comprising:
a steam condenser that expands the water steam discharged from the steam turbine to or below atmospheric pressure, thereby cooling and condensing the water steam, wherein
the water steam is cooled in the steam condenser by a cold water system driven by a cold water pump, and
part of the water steam discharged from the steam turbine flows into the condenser/evaporator, and the rest of the water steam discharged from the steam turbine flows into the steam condenser.

7. The binary power generation system according to claim 5, further comprising:
   a liquid medium downcomer that makes a bottom portion of the upper evaporator communicate with a bottom portion of the lower evaporator.

8. The binary power generation system according to claim 5, further comprising:
   a regenerator that cools the vapor medium discharged from the low pressure medium turbine and heats the liquid medium generated by the medium condenser, wherein
   the liquid medium heated by the regenerator is used as the cold source of the gas cooler.

\* \* \* \* \*